United States Patent [19]

Heep et al.

[11] Patent Number: 4,915,265
[45] Date of Patent: Apr. 10, 1990

[54] APPARATUS FOR FEEDING BULK MATERIAL

[75] Inventors: Dieter Heep, Bergatreute; Paul Vogel, Weingarten; Anton Mutscheller, Hohentengen-Eichen, all of Fed. Rep. of Germany

[73] Assignee: Waeschle Maschinenfabrik GmbH, Ravensburg, Fed. Rep. of Germany

[21] Appl. No.: 280,705

[22] Filed: Dec. 6, 1988

[30] Foreign Application Priority Data

Dec. 15, 1987 [DE] Fed. Rep. of Germany ....... 3742521

[51] Int. Cl.$^4$ ............................................. G01F 11/20
[52] U.S. Cl. ..................... 222/368; 277/174; 277/176; 277/190; 277/192; 277/199; 222/336; 222/337
[58] Field of Search ............... 222/349, 350, 351, 337, 222/367, 368; 277/174, 176, 190, 192, 199; 70/113, 114, 120; 418/257, 260

[56] References Cited

U.S. PATENT DOCUMENTS 4,155,486 5/1979 Brown .................................. 222/368
4,228,932 10/1980 Aonuma .............................. 222/368
4,784,298 11/1989 Heep et al. .......................... 222/350

Primary Examiner—H. Grant Skaggs
Assistant Examiner—W. Todd Waffner
Attorney, Agent, or Firm—Henry M. Feiereisen

[57] ABSTRACT

A rotary feeder includes a housing which accommodates a rotor including a plurality of vanes supported on a shaft. The rotary feeder is sealed in axial direction by slide rings which are acted upon by a pressure fluid and in radial direction by displaceable sealing strips which are contained in the peripheral end face of the vanes. The required contact pressure in axial direction as well as in radial direction is provided by a pressure fluid source which acts upon the annular piston-type slide rings. Each slide ring is pressed against a slide disk which is part of a lateral disk member of the rotor and is rotatable in circumferential direction to the slide disk. Each slide disk is provided in circumferential direction with slant grooves which are engaged by retaining bolts of a sealing strip unit contained in the peripheral end face of each vane and providing the radial sealing of the rotor vanes. The frictional force between the slide ring and the slide disk causes a rotation of the slide disk in opposition to the rotation of the rotor to thereby press the sealing strip unit in radial direction for generating a sufficient contact pressure for the radial sealing action.

15 Claims, 5 Drawing Sheets

APPARATUS FOR FEEDING BULK MATERIAL

BACKGROUND OF THE INVENTION

The present invention refers to an apparatus for feeding bulk material, in particular to a rotary feeder of the type including a housing provided with a top inlet and a bottom outlet and accommodating a cellular rotor which includes a plurality of radial vanes or blades fixed on a shaft which is supported in lateral bearing covers.

In a rotary feeder of this type, the vanes of the rotor radially extend from the shaft to the inner wall surface of the housing and are confined in axial direction by circular lateral disk members. Bearing against the peripheral area of the lateral disk members at the end face thereof facing the adjacent bearing cover is a slide ring which is guided for axial displacement in the respective bearing cover in non-rotational manner. The slide ring is made of polytetrafluoroethylene (PTFE) and ensures a sealing of the chambers between the lateral disk members of the rotor and the respective bearing cover against penetration of dusty particles of the bulk material. Further, the slide ring prevents leakage of air through these chambers which would otherwise occur in view of the differential pressure between the inlet side and the outlet side of the rotary feeder.

The slide ring is urged against the lateral disk members by several prestressed helical compression springs which are supported by and uniformly spaced about the circumference of the respective bearing cover. Practice has shown that the frictional conditions and the forces exerted in the area of the sliding surfaces between slide ring and lateral disk member are difficult to predict and to calculate in advance because of their dependency on numerous, partly time-varying parameters such as material of slide ring and laterial disk member, pressure differential between inlet and outlet of the rotary feeder or wear condition of the slide ring. Further, the compression springs causes a local flexure of the slide ring in the contact area with the latter, and increasing wear of the slide ring results in a decreasing prestress of the compression springs and thus in a decrease of the contact pressure of the slide ring against the respective lateral disk member.

US-PS 4,784,298 describes a rotary feeder with rotor vanes which includes a sealing strip unit for sealing the rotor in radial direction. The sealing strips are pressed against the inner wall surface of the housing by a contact pressure which is generated by a central adjusting unit. The shaft of the rotor is hollow and accommodates an axially displaceable adjusting bar which is acted upon by a compression spring and includes at least two axially spaced conical surfaces. Bearing against these conical surfaces are push rods which are guided in respective bores of the rotor vanes and bear with their other end against the sealing strip units to push same radially outwards. Each sealing strip unit is further acted upon by a pushback force which prevents the sealing strip units from being disengaged and counteracts the generated contact pressure. The pullback force is provided by further compression springs which force the sealing strip units back into the guide grooves of the vanes. Thus, the rotor of such a rotary feeder is of comparably complicated structure. In addition, the radial contact pressure decreases with increasing wear of the sealing strips because the prestress of the compression spring acting on the central adjusting unit diminishes with increasing lengthening of the spring.

SUMMARY OF THE INVENTION

It is thus an object of the present invention to provide an improved rotary feeder obviating the afore-stated drawbacks.

This object and others which will become apparent hereinafter are attained in accordance with the present invention by providing each lateral disk member in two parts that is a plate which is fixedly mounted on the shaft and a slide disk which is rotatably supported at the outside of the plate and against the outside of which the slide ring bears wherein the slide disk is provided with slant grooves which are engaged by retaining bolts of a sealing strip unit arranged in the peripheral end face of at least each second rotor vane so that a rotation of the slide disk causes a radial displacement of the sealing strip unit.

The provision of such lateral disk members considerably improves the axial sealing action thereof with the slide rings and simultaneously enhances the radial sealing action between the rotor vanes and the inner wall surface of the rotor housing.

The present invention is based on the teachings that the slide rings are acted upon by a constant contact force and bear against the slide disks which are rotatable relative to the rotor and in eccentric-like force-locking connection with the sealing strip unit in the rotor vanes. Thus, the frictional force essentially acting in circumferential direction between the slide ring and the pertaining slide disk tends to rotate the slide disk in opposition to the direction of rotation of the rotor and thus to press the sealing strips units radially outwards via the engagement between retaining bolts and slant grooves to thereby generate the required contact force.

In order to allow rotation of the slide disks, the latter are loosely received in a recess of the plate and supported via suitable ball bearings which are uniformly spaced about the circumference of the plate. Each ball bearing includes a flat guide groove in the plate and a ball partly received in a bore of the slide disk and projecting beyond the inner end face of the latter toward the plate. The projection is adjustable by a screw which can be actuated from outside.

According to a further feature of the invention, the slide disk and the slide ring are provided with wedge-shaped mating surfaces to define a sealing surface so that the contact force generates a force component which presses the slide disk radially outwards. The contact force may uniformly be applied against the circumference of the slide ring by a pressure fluid which is admitted into the annular space defined between the base of an axial groove accommodating the slide ring and the outer end face of the latter.

Preferably, each slide ring is prevented from any rotation by a bolt which is screwed with its front portion into the slide ring and projects with its remaining portion through the bearing cover toward the outside to allow indication of wear of the slide ring. A limitation of the stroke of the slide ring is accomplished by mounting a disk-like stop member at the rear end of the bolt which may run against a shoulder of a transparent cap sealingly enclosing the rearwardly projecting portion of the bolt.

According to further feature of the present invention, the constant contact force by which the slide ring is retained against the slide disk can be maintained in a simple manner by momentarily subjecting the slide ring preferably at periodic intervals to a displacement force which is higher than the contact force so as to ensure that the static friction between the slide ring and its guides is overcome. Since the displacement force is applied only momentarily, the slide ring is not subjected to increased wear. In addition, the momentarily increased displacement force prevents the forces of static friction which vary about the circumference of the slide ring from canting the latter in its guides. This feature is especially advantageous when making the slide rings on PTFE-base because the contact force should be maintained at a constant level within a relatively narrow range in order to achieve an optimum compromise between wear behavior and sealing action.

Preferably, the chamber defined between each bearing cover and adjacent lateral disk member of the rotor is filled with a barrier in form of a pressure fluid to prevent penetration of dusty bulk material. The use of a barrier fluid in this chamber is especially advantageous when using the rotary feeder for conveying very abrasive bulk material.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
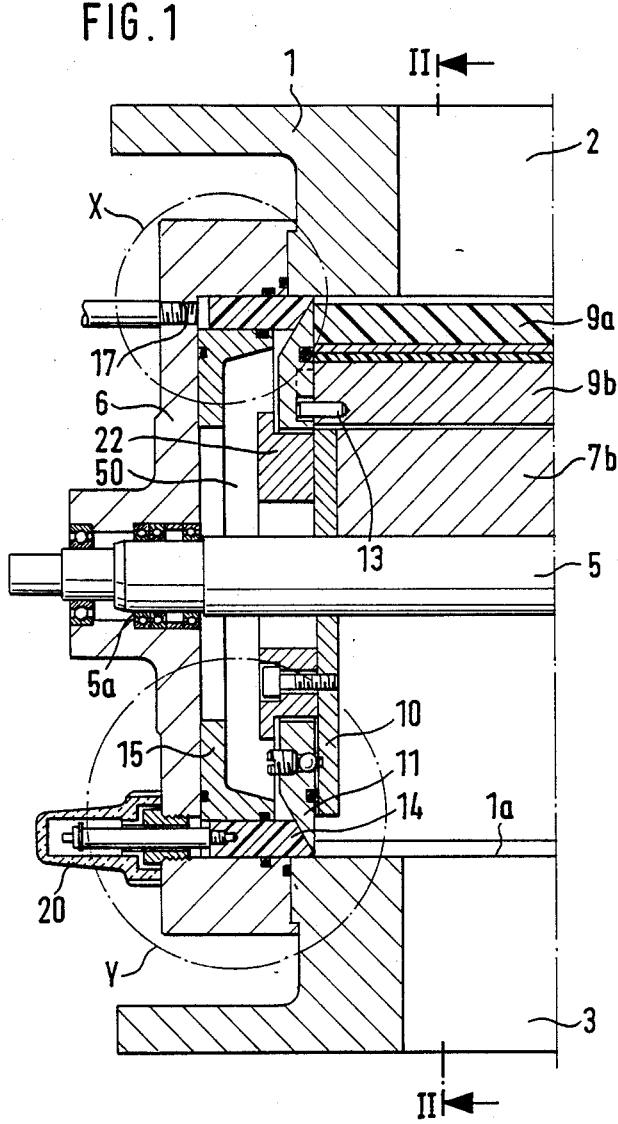
FIG. 1 is a longitudinal section of one half of one embodiment of a rotary feeder in accordance with the present invention.
Figure 2:
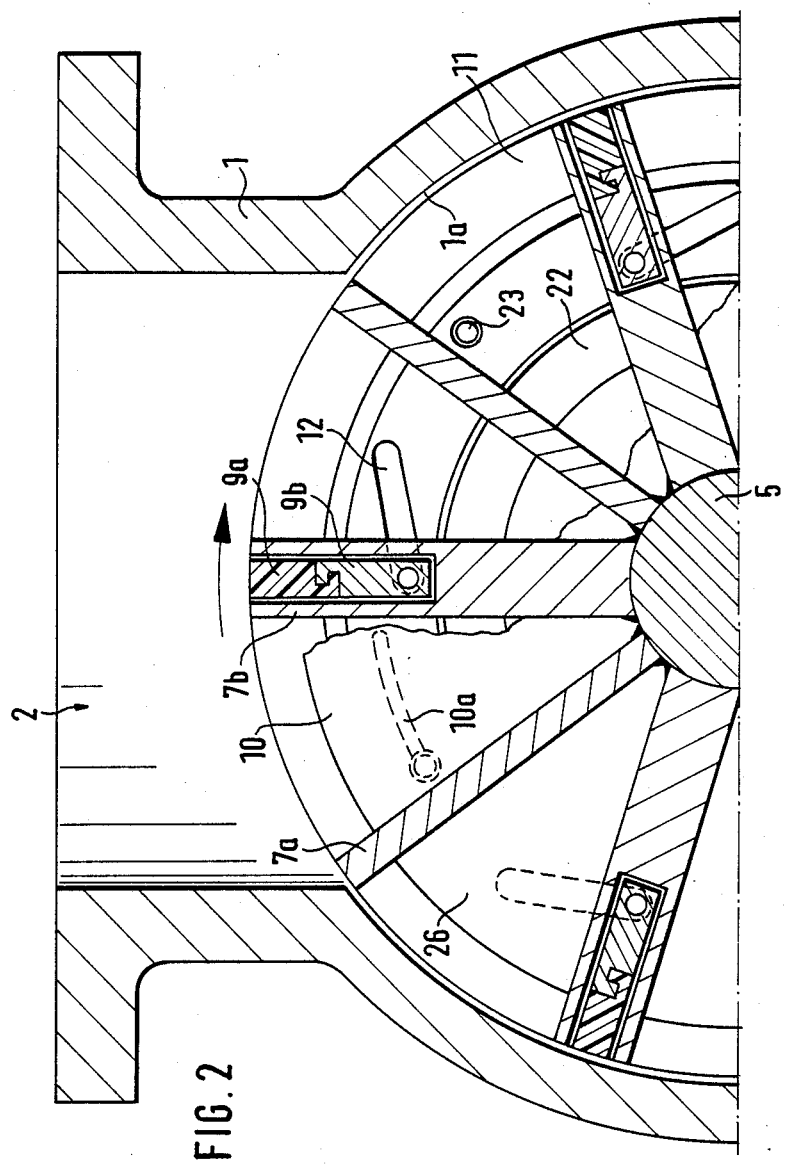
FIG. 2 is a cross sectional view of the rotary feeder taken along the line A—A in FIG. 1.

Referring now to the drawing, and in particular to FIGS. 1 and 2, there is shown a longitudinal section of one embodiment of an apparatus for feeding bulk material in form of a rotary feeder. The rotary feeder includes a housing 1 which defines an interior space and has a top inlet port 3 and a bottom outlet port 4. A cellular rotor is arranged in the interior space of the housing 1 and includes a plurality of alternatingly disposed narrow vanes 7a and broad vanes 7b. The vanes 7a, 7b are fixedly mounted on a shaft 5 and bear with their peripheral radial end faces against the inner wall surface of the housing 1 so as to define compartments 26 for transporting material from the inlet port 3 to the outlet port 4. The shaft 5 is rotatably supported by suitable bearings 5a arranged in lateral bearing covers 6 on opposite sides of the housing 1. Only one bearing cover 6 is shown in FIG. 1.

Figure 3:
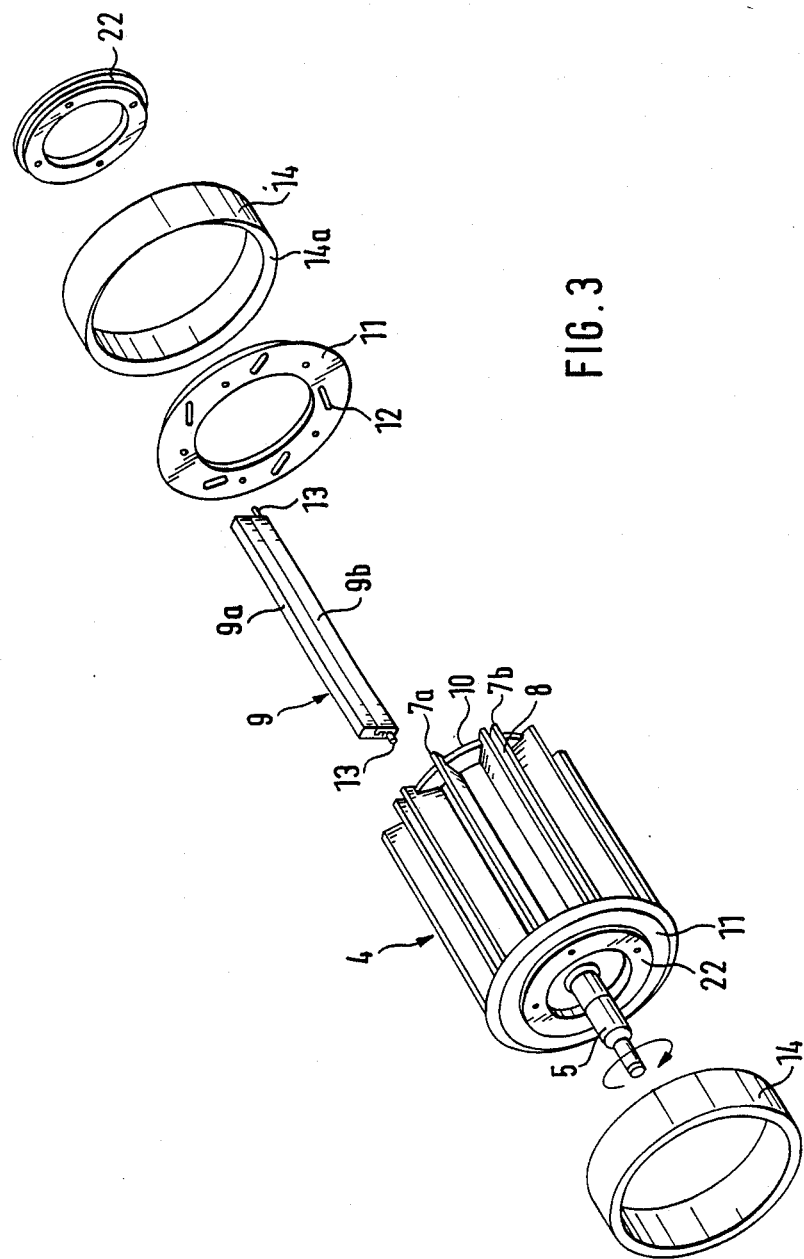
FIG. 3 is a perspective view in exploded illustration of the rotor of the rotary feeder with the elements for sealing the rotor.

As shown in particular in FIGS. 2 and 3, each of the broad rotor vanes 7b is provided with an axial groove 8 for receiving a sealing strip unit 9 comprising a sealing strip 9a and a sealing strip carrier 9b which are interlocked with each other in form-fitting manner via a claw-like connection.

The rotor vanes 7a, 7b extend between respective two-part lateral disk members comprising a plate 10 which is fixedly mounted on the shaft 5 and a slide disk 11 which is rotatably supported in sealing manner on the plate 10 and has an outer wedge-shaped end face 11a. Each slide disk 11 is provided at its inner end face with slant grooves 12 which extend at an angle to the circumferential direction such that with respect to the rotational direction of the rotor 4, the leading end of each groove 12 has a greater radial distance from the shaft 5 than the trailing end thereof.

Each groove 12 is assigned to a sealing strip unit 9. As shown especially in FIG. 3, the carrier 9b of each sealing strip unit 9 is provided at each axial end with an axial retaining bolt 13 which is engageable into the respective groove 12. By rotating the slide disks 11 in opposition to the direction of rotation of the rotor 4, the sealing units 9 are pressed radially outwards in the grooves 8 of the rotor 4 and thus bear tightly against the cylindrical inner wall surface of the housing 1. This radial sealing action is generated by the frictional force which is obtained by the axial sealing of the rotor 4 as will be described hereinafter.

Figure 4:
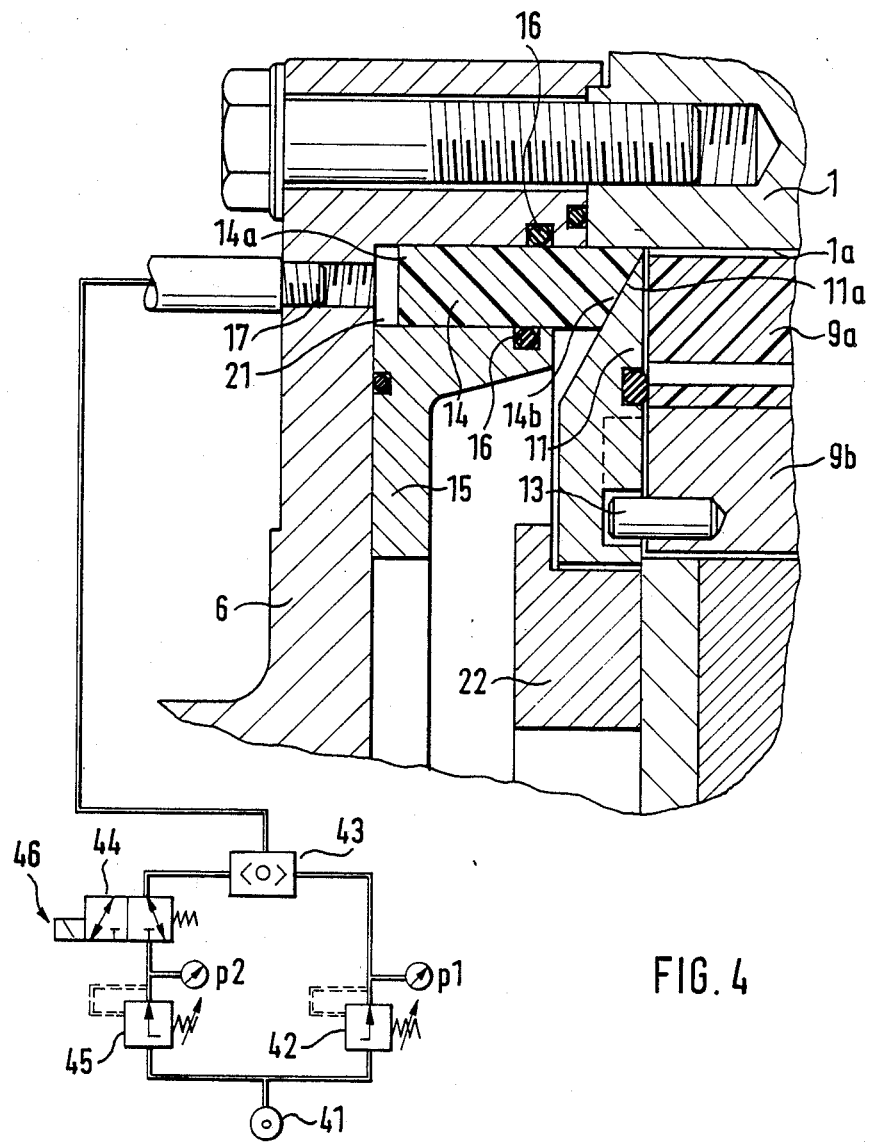
FIG. 4 is a partial longitudinal section of the rotary feeder on an enlarged scale according to area X as designated in FIG. 1.

The axial sealing of the rotor is accomplished by slide rings 14 as shown in FIGS. 1, 3 and 4. The slide rings 14 may be made of plastic material on PTFE-base and are guided in an axial annular groove defined by the respective bearing cover 6 and a guide ring 15 which is sealingly connected to the bearing cover 6. As shown in FIG. 4, the slide ring 14 is disposed in the annular groove at a distance to the bearing cover 6 so that an annular space 21 is defined. O-rings 16 provide a suitable sealing of the slide rings 14 which are thus designed like an annular piston against the outwardly directed end face 14a of which, a pressure fluid, preferably compressed air acts which is supplied into the annular space 21 through port 17 of the bearing cover 6.

As shown especially in FIG. 4, the slide ring 14 is provided with a wedge-shaped inner edge which is in mating contact with the wedge-shaped outer circumferential surface 11a of the slide ring 11 to define a sealing surface therebetween.

Figure 5:
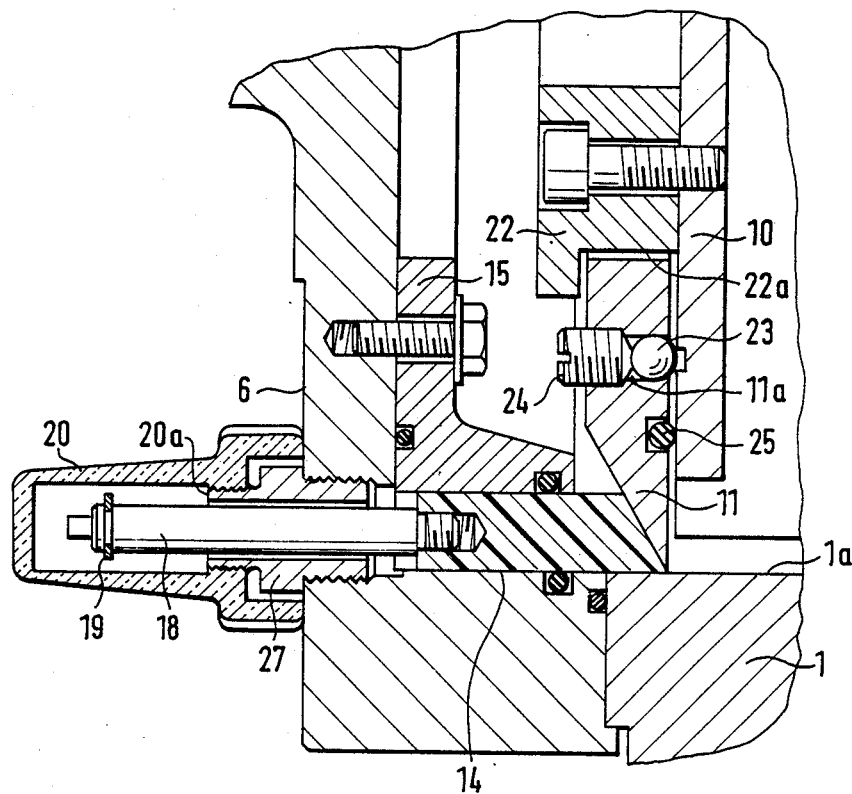
FIG. 5 is a partial longitudinal section of the rotary feeder on an enlarged scale according to area Y as designated in FIG. 1.

Referring now to FIG. 5, there can be seen that each slide ring 14 is prevented from any rotation by a locking mechanism in form of a bolt 18 which is screwed with its forward section into the slide ring 14 and projects with its remaining section through the bearing cover 6 toward the outside. The outwardly projecting section of the bolt 18 extends through an external support 27 which is suitably mounted to the outside of the bearing cover 6. Attached to the support 27 is a transparent cap 20 which encloses the outwardly projecting portion of the bolt 18 in pressure sealed manner.

At operation, the bolt 18 is moved with the slide ring 14 in axial direction so that the outwardly projecting section of the bolt 18 can simultaneously be used as indication of progressing wear of the slide ring 14. In order to limit the axial stroke or displacement of the slide ring 14, the bolt 18 is provided at its rearward end with a disk-like stop member 19 which runs against a shoulder 20a of the transparent cap 20 when the slide ring 14 is essentially worn out. Since being sealingly enclosed by the cap 20, the rearward end face of the bolt 18 is subjected via the annular space 21 and the support 27 to pressure fluid at a same pressure as the slide ring 14.

It will be appreciated that the bolt 18 may also be sealingly guided through the bearing cover 1b towards the outside without being enclosed by the cap 20. In this case, the bolt 18 is not acted upon by pressure fluid so that the slide ring 14 is pressure-relieved in the area where the bolt 18 is threadably engaged therewith.

When admitting pressure fluid into the annular space 21 through port 17, the slide ring 14 is pushed with its inner wedge-shaped edge 14b against the mating wedge-shaped outer circumferential surface 11a of the slide disk 11. The mating contact ensures the slide ring 14 to be retained securely against the inner wall surface 1a of the housing 1 and against the inner circumferential surface of the bearing cover 6. The mutually sliding mating surfaces of the slide ring 14 and the slide disk 11 generate a frictional force which is directed essentially in circumferential direction and tends to rotate the slide disk 11 in opposition to the rotational direction of the rotor 4.

In order to allow such rotation, the slide disk 11 is loosely retained in a recess 22a of a centering ring 22 threadably engaged with the plate 10 and is supported by the plate 10 via ball bearings uniformly spaced about the circumference of the plate 10. Each ball bearing comprises a flat groove 10a (FIG. 2) and a ball 23 which is shown in FIG. 5 is almost completely received in a bore 11a of the slide disk 11 and projects only slightly beyond the inner end face of the slide disk 11. By means of an adjusting screw 24, the projection of the ball 23 can be controlled. A O-ring 25 ensures a sealing between the plate 10 and the slide disk 11.

A rotation of the slide ring 11 relative to the plate 10 causes the retaining bolts 13 to shift in the slant grooves 12 so as to push the sealing strip units 9 radially outwards from the shown idle position of the rotor and to attain the desired sealing action between the rotor vanes 7b and the inner wall surface 1a of the housing 1.

It will be readily recognized that the magnitude of this radial contact pressure depends on the inclination of the grooves 12 and on the coefficient of friction between the slide ring 14 and the slide disk 11; However, the radial sealing action is changed in conformity with the axial sealing action. The quality of this sealing action is in principle independent on the wear condition of the respective sealing elements.

It should be taken into consideration, however, that between movable parts there are static frictional forces which are greater than the respective forces of the sliding friction. These static frictional forces can be overcome by momentarily increasing at periodic intervals the constant pressure exerted on the slide rings 14 by the pressure fluid admitted into the annular space 21.

A method by which a momentary increased pressure is generated is indicated in FIG. 4. The port 17 is connected to a pneumatically controlled OR element 43 whose one input is connected to a compressed air source 41 via a pressure regulator 42. The pressure in the compressed air source 41 is higher in comparison to the holding pressure $p_1$ which is set by the subsequent pressure regulator 42 and corresponds to the holding force by which each slide ring 14 is pushed against the respective slide disk 11. The second input of the OR-element 43 is connected to the same compressed air source 41 via a further pressure regulator 45 which applies a displacement pressure $p_2$ exceeding the holding pressure $p_1$. Interposed between the pressure regulator 45 and the OR-element 43 is a solenoid valve 44 which is momentarily energized at time intervals by electric control impulses from a control circuit 46 so that the second output of the OR element 43 is momentarily energized with the displacement pressure $p_2$ which acts momentarily upon the slide rings 14.

As shown in particular in FIG. 1, the lateral disk members 10, 11 of the rotor define with the respective bearing covers 6 chambers 50 which should be kept dust-free in order to prevent dust deposits on the guide surfaces of the slide rings 14 and on the bearings 5a of the shaft 5. Accordingly, these chambers 50 contain a barrier in form of a pressure fluid admitted through suitable connections (not shown) in the bearing covers 6. Pressure fluid such as compressed air may be used which suitably could be supplied from the compressed-air source 41 as long as its pressure is higher than the highest pressure prevailing in the interior space of the rotor.

While the invention has been illustrated and described as embodied in an Apparatus for Feeding Bulk Material, it is not intended to be limited to the details shown since various modifications and structural changes may be made without departing in any way from the spirit of the present invention.

What is claimed as new and desired to be protected by Letters Patent is set forth in the appended claims.

We claim:

1. Apparatus for feeding bulk material; comprising:
   a housing having inlet means and outlet means and being provided with lateral bearing covers;
   a rotor accommodated in said housing and having a shaft supported in said bearing covers and a plurality of radially extending vanes mounted on said shaft to define compartments for transporting the bulk material from said inlet means to said outlet means;
   first sealing means for axially sealing said rotor in said housing, said first sealing means including lateral disk members confining axial extension of said vanes and a slide ring axially slidable in non-rotational manner in each bearing cover and bearing against the periphery of the adjacent disk member, each disk member including a plate fixedly mounted on said shaft and a slide disk arranged at the outside of said plate and rotatably supported thereto wherein said slide ring bears against said slide disk, each of said slide disks having an inner end face provided with slant grooves facing said vanes and having in rotational direction of said rotor a leading end spaced at a greater radial distance from said shaft than the trailing end thereof;
   force-applying means acting on said slide ring for providing a contact force by which said slide ring is pressed against said slide disk; and
   second sealing means disposable in at least each second one of said vanes at the peripheral end face thereof facing said housing and extending parallel to said shaft for radially sealing said vanes against said housing, said second sealing means being provided at their lateral end faces with axial retaining bolts which engage said grooves of said slide disks so as to allow radial displacement of said second sealing means when said slide disk is rotated relative to said plate.

2. Apparatus as defined in claim 1 wherein said second sealing means includes a sealing strip and a sealing strip carrier connected in force-locking manner with said sealing strip, said retaining bolts being arranged in said sealing strip carrier.

3. Apparatus as defined in claim 1, and further comprising a O-ring arranged between said slide disk and said plate.

4. Apparatus as defined in claim 1 wherein said slide ring is provided with an inner wedge-shaped surface and said slide disk is provided with an outer wedge-shaped surface facing said inner wedge-shaped surface of said slide ring to define a sealing surface and to thereby allow the contact force to generate a force component which pushes said slide ring radially outwards.

5. Apparatus as defined in claim 1 wherein each of said bearing covers defines with the adjacent one of said lateral disk members of said rotor pressure a chamber which contains a barrier fluid at a pressure greater than the highest pressure in the interior of said housing.

6. Apparatus as defined in claim 1, and further comprising ball bearing means for supporting each slide disk in said plate, said ball bearing means including ball bearings uniformly spaced about the circumference of said plate.

7. Apparatus as defined in claim 6 wherein each ball bearing includes a flat guide groove arranged in said plate and a ball partly received in a bore of said slide disk and projecting beyond the inner end face of said slide disk toward said plate.

8. Apparatus as defined in claim 7, and further comprising control means for adjusting the projection of said ball beyond the inner end face of said slide disk, said control means including an adjusting screw threadably engaged in said bore and actuatable from outside.

9. Apparatus as defined in claim 1 wherein each of said bearing covers defines an axial annular groove, each of said slide rings being designed in form of an annular piston and sealingly guided in said axial annular groove of said bearing covers wherein an annular end face of said slide ring and the base of said annular groove defines an annular space, said force-applying means including pressure fluid which is admitted into said annular space via a port in said bearing cover.

10. Apparatus as defined in claim 9 wherein said force-applying means includes a pneumatically controlled OR-element with an output operatively connected to said port, a first input being energized by a predetermined holding pressure which corresponds to said contact force by which said slide ring is pressed against said slide disk and a second input being energized momentarily by a displacement pressure which corresponds to a predetermined displacement force and is higher than said contact force.

11. Apparatus as defined in claim 10 wherein said force-applying means includes a solenoid valve operatively connected to said second input of said OR-element to momentarily provide said displacement pressure.

12. Apparatus as defined in claim 1, and further comprising locking means for preventing rotation of each slide ring, said locking means including a bolt connected in force-locking manner with said slide ring and projecting outwardly beyond said bearing cover for allowing indication of wear of said slide ring.

13. Apparatus as defined in claim 12 wherein said bolt is provided at its rearward end with a disk-like stop member for limiting displacement and stroke of said slide ring.

14. Apparatus as defined in claim 12, and further comprising a transparent cap connected in pressure-sealed manner with said bearing cover and enclosing said bolt along its section projecting outwardly beyond said bearing cover.

15. Apparatus for feeding bulk material; comprising:
a rotor having a plurality of radially extending vanes to define compartments for transporting the bulk material from an inlet to an outlet;
first sealing means for axially sealing said rotor and including lateral disk members confining axial extension of said vanes and a slide ring axially slidable in non-rotational manner and bearing against the periphery of the adjacent disk member, each disk member including a plate fixedly mounted on a shaft of said rotor and a slide disk arranged at the outside of said plate and rotatably supported thereto wherein said slide ring bears against said slide disk, each of said slide disks having an inner end face provided with slant grooves facing said vanes and having in rotational direction of said rotor a leading end spaced at a greater radial distance from said shaft than the trailing end thereof;
force-applying means acting on said slide ring for providing a contact force by which said slide ring is pressed against said slide disk; and
second sealing means disposable in at least each second one of said vanes at the peripheral end face thereof for sealing said vanes in radial direction, said second sealing means being provided at their lateral end faces with axial retaining bolts which engage said grooves of said slide disks so as to allow radial displacement of said second sealing means when said slide ring is pressed against said slide disk to thereby rotate the latter relative to said plate.

* * * * *